United States Patent
Herman

(10) Patent No.: US 10,807,310 B2
(45) Date of Patent: Oct. 20, 2020

(54) 3D PRINTER NOZZLE GAP SETTING BY FORCE FEEDBACK

(71) Applicant: Robert Bosch Tool Corporation, Broadview, IL (US)

(72) Inventor: Gregory A. Herman, Elk Grove Village, IL (US)

(73) Assignee: ROBERT BOSCH TOOL CORPORATION, Broadview, IL (US)

( * ) Notice: Subject to any disclaimer, the term of this patent is extended or adjusted under 35 U.S.C. 154(b) by 217 days.

(21) Appl. No.: 15/661,464

(22) Filed: Jul. 27, 2017

(65) Prior Publication Data

US 2019/0030818 A1 Jan. 31, 2019

(51) Int. Cl.
*B29C 64/393* (2017.01)
*B29C 64/118* (2017.01)
*B29C 64/209* (2017.01)
*B33Y 10/00* (2015.01)
*B33Y 30/00* (2015.01)
*B33Y 50/02* (2015.01)

(52) U.S. Cl.
CPC .......... *B29C 64/393* (2017.08); *B29C 64/118* (2017.08); *B29C 64/209* (2017.08); *B33Y 10/00* (2014.12); *B33Y 30/00* (2014.12); *B33Y 50/02* (2014.12)

(58) Field of Classification Search
CPC ............................. B29C 64/93; B29C 64/118
See application file for complete search history.

(56) References Cited

U.S. PATENT DOCUMENTS

| 4,899,288 A | * | 2/1990 | Tsutsumi | B29C 45/30 425/144 |
| 9,174,388 B2 | * | 11/2015 | Batchelder | B29C 67/0055 |
| 10,155,346 B1 | * | 12/2018 | Gorgi | B33Y 10/00 |
| 2007/0228592 A1 | | 10/2007 | Dunn et al. | |
| 2013/0209739 A1 | * | 8/2013 | Fruth | B05D 3/00 428/156 |
| 2013/0242317 A1 | | 9/2013 | Leavitt et al. | |

(Continued)

FOREIGN PATENT DOCUMENTS

WO 2015/073367 A1 5/2015

OTHER PUBLICATIONS

Circuit Globe, Back EMF in DC Motor, Jul. 2, 2017 (Year: 2017).*
What is the different between a gear and a pinion?, Quora, Aug. 7, 2015 (Year: 2015).*

*Primary Examiner* — Timothy Kennedy
*Assistant Examiner* — Farah Taufiq
(74) *Attorney, Agent, or Firm* — Norton Rose Fulbright US LLP; Gerard Messina; Aaron Grunberger

(57) ABSTRACT

A system and method of controlling a 3D printer includes a processor obtaining from a sensor respective sensor values for each of a plurality of distances between a nozzle of the 3D printer and a build plate of the 3D printer, which sensor values each characterizes a characteristic of deposition of filament from the nozzle and onto the build plate at the respective distances to which the sensor values correspond; identifying, based on the obtained sensor values, a maximum and/or minimum value of the characteristic; and setting, based on the identified maximum and/or minimum, an initial gap between the nozzle and the build plate at which to deposit a first layer of an object to be synthesized.

20 Claims, 4 Drawing Sheets

(56) References Cited

U.S. PATENT DOCUMENTS

| | | | |
|---|---|---|---|
| 2015/0165683 A1* | 6/2015 | Cheverton | G06T 7/0004 |
| | | | 382/141 |
| 2015/0367415 A1* | 12/2015 | Buller | B23K 26/346 |
| | | | 419/53 |
| 2016/0151978 A1* | 6/2016 | Lin | B29C 64/386 |
| | | | 264/40.7 |
| 2016/0339634 A1* | 11/2016 | Fuller | B29C 64/20 |
| 2017/0050374 A1* | 2/2017 | Minardi | B29C 64/124 |
| 2017/0371317 A1 | 12/2017 | Share et al. | |
| 2018/0154589 A1 | 6/2018 | Herman et al. | |
| 2018/0178448 A1* | 6/2018 | Kakuta | B29C 64/209 |
| 2018/0297113 A1* | 10/2018 | Preston | B29C 64/165 |
| 2018/0354196 A1* | 12/2018 | Wu | B29C 64/245 |

\* cited by examiner

3D PRINTER NOZZLE GAP SETTING BY FORCE FEEDBACK

FIELD OF THE INVENTION

The present invention relates to a system and method for setting a gap between a build surface and a nozzle of a three-dimensional (3D) printer for an initial print layer.

BACKGROUND 3D printing, or additive manufacturing, is a process of making three dimensional solid objects, for example, based on blueprints provided by digital files and/or by scanning a solid object to be copied by the 3D printer. The synthesis of the desired 3D solid object is achieved by strategically generating successive layers of an additive material in a pattern on a build surface of a platform of a 3D printer until the entire object is created. The synthesis of the 3D object can be driven, for example, by the digital files that provide the specifications that describe how to create the pattern of layers and the materials used to generate the object.

3D printers are generally protected from external influences by a build cage, and, within the build cage, the 3D printer includes a build platform with the build surface on which the synthesis process is executed. Before building (printing) a 3D object on the build platform, the build platform should be set to a level state. For this purpose, the build platform can include a platform frame on legs, e.g., two front legs and one center rear leg, and a platform plate on the platform frame, with springs, for example at positions corresponding to each of the front two legs, biasing the platform plate upwards away from the platform frame but being independently compressible for moving the platform plate downward closer to the platform frame at the two front legs until the build platform is determined to be at a level state, at which point the position of the platform plate relative to the platform frame can be locked.

The generation of the successive layers of the additive material can be performed, for example, according to any one of: (1) Vat Photopolymerisation, (2) Material Jetting, (3) Binder Jetting, (4) Direction Energy Deposition, (5) Powder Bed Fusion, (6) Sheet Lamination, or (7) Material Extrusion. Specific processes of Material Extrusion used to generate the successive layers can involve making sequential deposits using fused deposition modeling ("FDM"), fused filament fabrication ("FFF"), or Direct Ink Writing ("DIW").

The materials used as the "ink" of the 3D printer to generate the 3D object can include, for example, filaments of any of: powder material, polymer material, thermoplastics, eutectic metals, edible materials, rubbers, modeling clay, plasticine, metal clay, ceramic materials, metal alloys, papers, composite materials composed of ceramics and metallic materials ("cermet"), metal matrix composites, ceramic matrix composites, photopolymers, plaster, stainless steel, aluminum, plastic film, and metal foil. The filament is heated at the printer head, extruded through a nozzle, and deposited onto a build surface of the build platform, for example, as described in U.S. patent application Ser. No. 15/195,456, filed Jun. 28, 2016 and in U.S. patent application Ser. No. 15/371,018, filed Dec. 6, 2016, the content of each which are hereby incorporated by reference herein in their entireties.

The nozzle is initially positioned at an initial distance in the z direction (z distance) from the build surface, i.e., with an initial gap (initial z gap), for depositing a first layer of the object to be synthesized by extruding filament through the nozzle while the nozzle is shifted in the x-y plane. After each layer is deposited, where another layer is to be deposited, the z distance between the nozzle and the build surface is increased by a preset amount, by shifting the nozzle upwards in the z direction or shifting the build surface downward in the z direction, and the next layer is then deposited on a previously deposited layer.

Many 3D printers set the initial z gap between the nozzle and the build surface by using a probe sensor to sense the presence and position of the build surface and then shifting the build surface or nozzle to change the initial z gap to a predefined setting.

SUMMARY

The initial z gap, which is usually approximately 0.2-0.3 mm, at which the first layer of an object to be synthesized is deposited onto the print surface is critical in FFF fabrication. If the initial z gap is wider than 0.3 mm, the initial base deposited layer might not bond adequately to the build surface, resulting in the print failing. On the other hand, if the initial z gap is smaller than 0.2 mm, the object synthesized may be deformed due to the melted filament exiting the nozzle squishing outward when laid onto the build surface, the printed object may bond too strongly with the build surface resulting in possible damage to the object when being removed from the build surface, the nozzle may become clogged by the filament resulting in damage to the printer and/or a misshapen synthesized object, the filament may be blocked from being extruded to build the first layer of the object, etc.

Processes setting the z gap to a preset value, e.g., between 0.2-0.3 mm, using a probe sensor are prone to errors with respect to calibration of the components involved in the sensing of measurements and with respect to accuracy of the measurements.

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

Example embodiments of the present invention provide a system and method that uses feedback concerning a sensed force generated by the deposition of filament on the build surface to set the initial z gap. In this regard, the smaller the initial z gap, the greater the force generated by the deposition of filament onto the build surface due to the limit on the amount of space in which the melted filament being deposited can spread.

In an example embodiment, the system and method obtain a value of the least force generated from the deposition of filament onto the build surface, corresponding to a most unobstructed deposition at a large initial z gap and use feedback from a sensor to identify a maximum sensed force resulting from the deposition of filament onto the build surface, corresponding to the smallest initial z gap. The system and method then set the initial z gap based on the identified maximum sensed force. In an example embodiment, the obtained value of the least force generated from the deposition of filament is also used for setting the initial z gap.

In an example embodiment, the setting of the initial z gap based on the identified maximum sensed force includes setting the initial z gap to a value at which a force generated by the filament deposition is a predetermined percentage between the obtained value of the least force generated and the identified maximum sensed force.

In an alternative example embodiment, the setting of the initial z gap based on the identified maximum sensed force includes enlarging the initial z gap by a predefined amount, e.g., 0.2 mm, from a position at which the maximum sensed force was sensed.

In an example embodiment, a sensor produces signals corresponding to the force generated by the deposition of filament as the nozzle deposits filament while being shifted in the x-y plane at each of a plurality of z gaps set by setting the z position of the nozzle or the build plate, the top surface of which is the build surface. The various output signals corresponding to the different z gaps are processed to identify the maximum sensed force.

In an example embodiment, the sensor senses an amount of power needed to drive a motor to shift the filament a predefined distance through a connector tube leading to the nozzle, the sensed amount of needed power corresponding to an amount of back Electro-Motive Force (EMF), which is the electromotive force pushing against the current driving the motor. For example, a driver that controls a power source powering the motor includes a sensor that senses that the motor is not moving sufficiently to move the filament the predefined distance, determines the amount by which the power must be raised to move the motor sufficiently, and controls the power source to provide the determined amount of power, which corresponds to the force generated by the deposition of the filament.

In an alternative example embodiment, a sensor senses angular displacement of a drive gear driven by the motor under the influence of a preset amount of drive power, where the less the angular movement, e.g., per unit of time, at the preset amount of drive power, the greater the force generated by the deposition of the filament.

In an alternative example embodiment, a sensor senses angular displacement of an idler wheel that turns as the filament travels linearly through the connector tube under influence of the drive gear, which, in turn is driven by the motor under the influence of a preset amount of drive power, where the less the angular movement, e.g., per unit of time, at the preset amount of drive power, the greater the force generated by the deposition of the filament.

In an alternative example embodiment, a sensor senses linear displacement of the filament as the filament travels linearly through the connector tube under influence of the drive gear, which, in turn is driven by the motor under the influence of a preset amount of drive power, where the less the linear movement, e.g., per unit of time, at the preset amount of drive power, the greater the force generated by the deposition of the filament.

In an alternative example embodiment, a pressure sensor senses a pressure applied to the build plate during the filament deposition, which depends on the force generated by the filament deposition and therefore corresponds to the initial z gap.

In an alternative example embodiment, a pressure sensor senses a pressure applied to the nozzle during the filament deposition, which depends on the force generated by the filament deposition and therefore corresponds to the initial z gap.

It is noted that, in the embodiments in which angular displacement, linear displacement, or pressure sensors are used, it is not necessary to convert the sensor output signals of angular displacement, linear displacement, or pressure sensor values to force values for setting the initial z gap, but instead those sensor values can be used directly for setting the initial z gap in the same manner as described in the embodiments in which the initial z gap is set based on force values. It is further noted that, according to the embodiment in which the initial z gap is enlarged a predefined amount from the position at which an outer boundary of the sensed characteristic was sensed, where displacement is used instead of force, the outer boundary of the sensed characteristic is the minimum sensor value rather than the maximum sensor value, i.e., the enlargement is of a predefined amount from the position at which the minimum sensed displacement was sensed. This is because the force and displacement are inversely related, i.e., the greater the force, the less the displacement.

In an example embodiment, the obtaining of the value of the least force generated is performed by the system and method using feedback from the sensor to identify the value of the least force generated. Specifically, in an example embodiment, the system and method initially set the nozzle or the build plate to a predefined z position, at which the z gap between the nozzle and build plate is very large, and the system and method obtain a force sensor value (or equivalent) for that z gap as a baseline force value.

The system and method then incrementally reduces the z gap by a predefined amount, and obtains a new sensor reading at each of the z gaps, until it is detected that the maximum force (or equivalent) sensor value has been reached. For example, in an example embodiment, the system and method detect that the maximum force sensor value has been reached when, after it has been determined that sensor values were changing for changes in z gaps, it is then determined that the sensor values between succeeding z gap settings at which sensor values were obtained did not change or did not change at least a threshold amount. Alternatively, in an example embodiment, the system and method detect that the maximum force sensor value has been reached when there is a large spike in the change of the sensor values between succeeding z gap settings. For example, it is expected that there may be a large spike between the value obtained at the z gap at which maximum force is generated and the value obtained at the immediately preceding set z gap, and it is expected that, once the z gap at which maximum force is generated is reached, the values obtained thereafter would not change the threshold amount between successive sensor readings.

An example embodiment of the present invention is directed to a 3D printer arrangement including a 3D printer, a sensor, and processing circuitry, where the processing circuitry is configured to obtain from the sensor signals corresponding to readings of force (or an equivalent measurement) caused by the deposition of filament by the 3D printer onto a build surface of a build plate of the 3D printer at various z gaps, identify a maximum force signal of the obtained force signals, select a z gap to be used as an initial z gap for a first layer of a print of an object, and control a component of the 3D printer to shift to a position at which the selected z gap would be set.

An example embodiment of the present invention is directed to processing circuitry configured to obtain from a sensor signals corresponding to readings of force (or an equivalent measurement) caused by the deposition of filament by the 3D printer onto a build surface of a build plate of the 3D printer at various z gaps, identify a maximum force signal of the obtained force signals, select a z gap to be used as an initial z gap for a first layer of a print of an object, and output a control signal for controlling a component of the 3D printer to shift to a position at which the selected z gap would be set.

An example embodiment of the present invention is directed to a non-transitory computer-readable medium on which are stored instructions that are executable by a processor and that, when executed by the processor, cause the processor to perform a method that includes obtaining from a sensor signals corresponding to readings of force (or an equivalent measurement) caused by the deposition of filament by the 3D printer onto a build surface of a build plate of the 3D printer at various z gaps, identifying a maximum force signal of the obtained force signals, selecting a z gap to be used as an initial z gap for a first layer of a print of an object, and outputting a control signal for controlling a component of the 3D printer to shift to a position at which the selected z gap would be set.

An example embodiment of the present invention is directed to a method performed by a processor, where the method includes obtaining from a sensor signals corresponding to readings of force (or an equivalent measurement) caused by the deposition of filament by the 3D printer onto a build surface of a build plate of the 3D printer at various z gaps, identifying a maximum force signal of the obtained force signals, selecting a z gap to be used as an initial z gap for a first layer of a print of an object, and outputting a control signal for controlling a component of the 3D printer to shift to a position at which the selected z gap would be set.

According to an example embodiment of the present invention, a method of controlling a three-dimensional (3D) printer includes: obtaining, by a processor and from a sensor, respective sensor values for each of a plurality of distances, or z gaps, between a nozzle of the 3D printer and a build plate of the 3D printer, which sensor values each characterizes a characteristic of deposition of filament from the nozzle and onto the build plate at the respective distances to which the sensor values correspond; identifying, by the processor and based on the obtained sensor values, a maximum and/or minimum value of the characteristic; and setting, by the processor and based on the identified maximum and/or minimum value, an initial gap between the nozzle and the build plate at which to deposit a first layer of an object to be synthesized.

In an example embodiment, the characteristic is a force generated by the deposition. In an example embodiment, the setting includes setting the initial gap to one in which the force generated by the deposition of filament is a predefined percentage between the maximum value and the minimum value. In an alternative example embodiment, the setting includes setting the initial gap to be a predetermined amount less than the gap at which the maximum value occurs. In an example embodiment, the force is a back Electro-Motive Force (EMF) against a motor driving a filament through the nozzle during the deposition. In an alternative example embodiment, the force is a force applied against the build plate. In an example embodiment, the force is a force applied against the nozzle.

In an example embodiment, the characteristic is a pressure generated by the deposition. In an example embodiment, the pressure is one applied against the build plate and/or the nozzle.

In an example embodiment, the characteristic is a displacement of a component of or within the 3D printer during the deposition. In an example embodiment, the displacement is an angular displacement of a component of the 3D printer during the deposition. In an example embodiment, the angular displacement is of a gear wheel that rotates to linearly displace the filament to expel the filament through the nozzle. In an alternative example embodiment, the angular displacement is of an idler wheel that rotates when the filament is linearly displaces for expelling the filament through the nozzle. In an alternative example embodiment, the displacement is a linear displacement occurring in the 3D printer during the deposition. In an example embodiment, the linear displacement is of the filament. In an example embodiment, the setting of the initial gap is based on the minimum value and includes selecting a vertical position of the nozzle or build plate that is a predefined distance from the vertical position of the nozzle or build plate at which the distance, to which the minimum value corresponds, is established.

In an example embodiment, the obtaining of the sensor values includes: setting the gap to an initial large value and iteratively reducing the gap stepwise by a predefined amount, e.g., 0.1 mm; controlling the 3D printer to deposit filament in each iteration; and receiving from the sensor a respective one of the sensor values in each iteration characterizing the deposition during the respective iteration. In an example embodiment, the identifying includes determining that the obtained sensor values of two or more immediately contiguous ones of the iterations are substantially the same after having changed between prior ones of the iterations.

According to an example embodiment of the present invention, a system includes: a 3D printer that includes a nozzle and a build plate; a sensor; and processing circuitry communicatively coupled to the sensor, where the processing circuitry is configured to: obtain from the sensor respective sensor values for each of a plurality of distances between a nozzle of the 3D printer and a build plate of the 3D printer, which sensor values each characterizes a characteristic of deposition of filament from the nozzle and onto the build plate at the respective distances to which the sensor values correspond; identify, based on the obtained sensor values, a maximum and/or minimum value of the characteristic; and set, based on the identified maximum and/or minimum value, an initial gap between the nozzle and the build plate at which to deposit a first layer of an object to be synthesized.

According to an example embodiment of the present invention, a non-transitory computer-readable medium stores instructions that are executable by a processor and that, when executed by the processor, cause the processor to perform a method of controlling a three-dimensional (3D) printer, where the method includes: obtaining from a sensor respective sensor values for each of a plurality of distances between a nozzle of the 3D printer and a build plate of the 3D printer, which sensor values each characterizes a characteristic of deposition of filament from the nozzle and onto the build plate at the respective distances to which the sensor values correspond; identifying based on the obtained sensor values, a maximum value and/or a minimum value of the characteristic; and setting, based on the identified maximum value and/or minimum value, an initial gap between the nozzle and the build plate at which to deposit a first layer of an object to be synthesized.

It is noted that because the setting of the initial z gap is based on a sensed maximum of forces that have been sensed at each of a plurality of z gaps, the setting is essentially self-calibrating because it is based on a measurement value relative to other measurement values, and therefore the setting of the initial z gap is especially reliable.

Although various aspects of the example embodiments of the present invention may be described independently, combinations of the example embodiments are understood to be referred to herein. In addition, and conversely, it should be understood that although a feature may be described in the context of a combination with other features, the different features are separable and do not necessarily require or rely on one another for a functional or useful embodiment of the present invention.

The aspects described in the foregoing are presented merely to provide a brief summary of these example embodiments, and these aspects are not intended to limit the scope of this disclosure. Indeed, the present invention may also encompass a variety of other aspects. These and other features, aspects, and advantages of the present invention are further clarified by the following detailed description of certain exemplary embodiments in view of the accompanying drawings throughout which like characters represent like parts.

DETAILED DESCRIPTION

Figure 1:
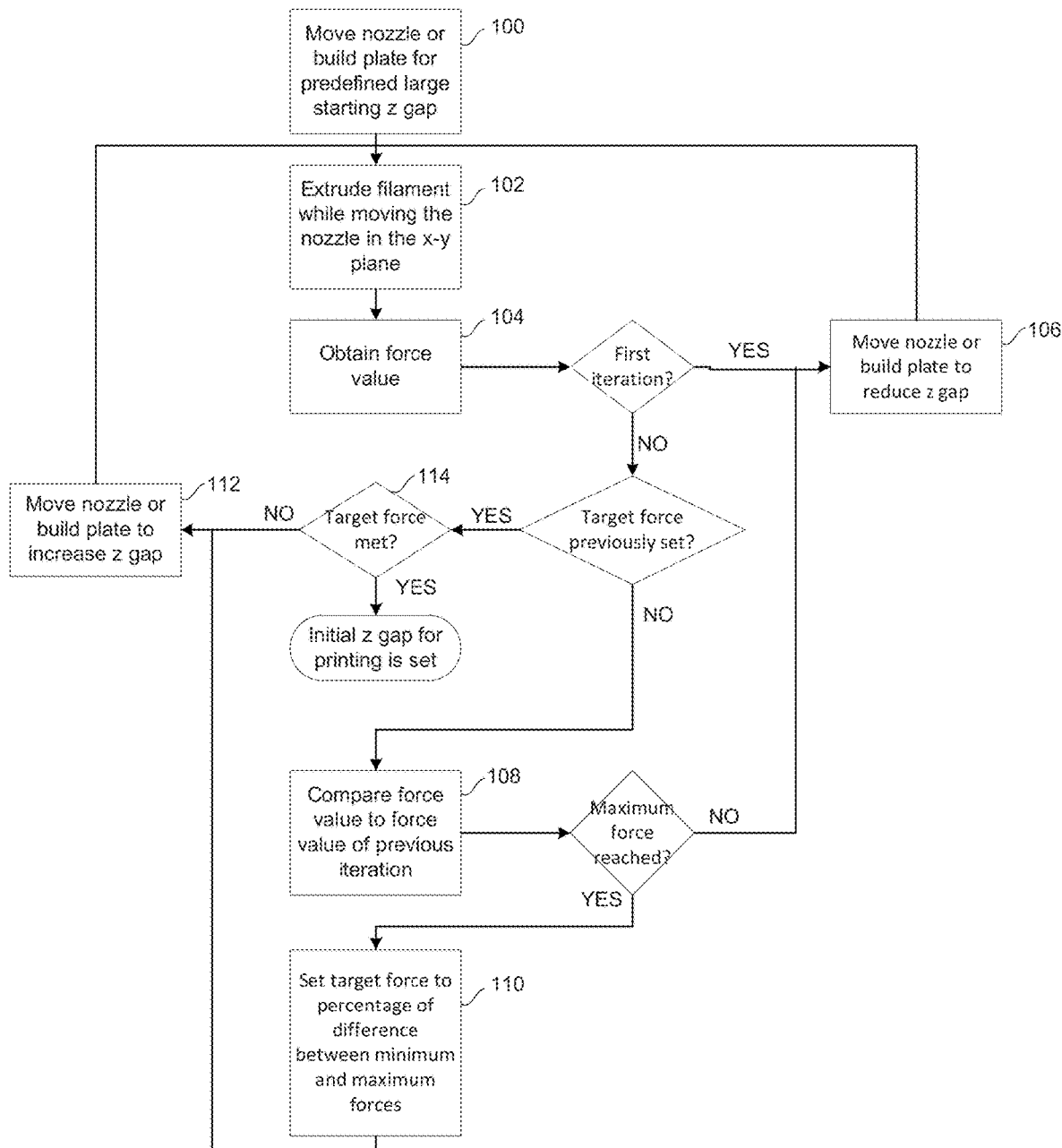
FIG. 1 is a flowchart that illustrates a method of setting a z gap of a 3D printer according to an example embodiment of the present invention.

FIG. 1 is a flowchart that illustrates a method according to an example embodiment of the present invention. At step 100, processor controls a nozzle or a build plate of a 3D printer to move the controlled component to a position at which there is a predefined large starting z gap between the nozzle and build plate. The large starting z gap is defined to be well out of the plausible range for printing, to ensure that the smallest force is generated. At step 102, the nozzle of the 3D printer extrudes filament while moving in the x-y plane over the build plate. At step 104, the processor obtains a sensor signal output by a sensor and that indicates a value of a force generated by the extrusion of the filament.

After the first iteration of obtaining the force value, the system and method proceeds to step 106 at which the processor controls the nozzle or build plate to move the controlled component to a new position at which the z gap is reduced, as compared to the prior iteration, by a predefined amount, for a stepwise reduction of the z gap from iteration to iteration.

After performing step 104 in subsequent iterations, prior to the setting of a target force, the system and method proceeds to step 108. At step 108, the processor compares the latest force value to the force value of the previous iteration to determine if the maximum force has been reached.

For example, in an example embodiment, the processor determines that the maximum force sensor value has been reached when, after it has been determined that sensor values were previously changing in between pairs of prior iterations of changes to the z gap, it is then determined that the sensor values between succeeding z gap settings at which force values were obtained did not change or did not change at least a threshold amount. Alternatively, in an example embodiment, the processor determines that the maximum force sensor value has been reached when there is a large spike in the change of the sensor values between succeeding z gap settings. For example, it is expected for there to be a large spike between the value obtained at the z gap at which maximum force is generated and the value obtained at the immediately preceding set z gap, and it is expected that, once the z gap at which maximum force is generated is reached, the values obtained thereafter would not change the threshold amount between successive sensor readings.

It is noted that even prior to reaching the maximum force, it is expected for there to be a spike in the values and it is expected for there to be initial pairs of iterations without the force values changing the threshold amount. Specifically, prior to the z gap reaching the approximate range at which printing occurs, i.e., while the z gap is very large, there can be a number of iterations without any increase in the force values, and then when the z gap closes to within the range at which printing occurs, there can be an initial spike in the force value, with a continued gradual increase in the force value for each further iteration until the nozzle scrapes up against the build plate, at which point there can be a large spike in the force value without any significant further changes in the force value between subsequent iterations. Therefore, in an example embodiment, the processor identifies the reaching of the maximum force by identification of consecutive iterations without a threshold change in the force value or by identification of a significant spike in the force value after a previous spike had occurred and/or only after changes of the force values of successive iterations had been previously detected.

If the maximum force has not been determined to have been reached, the system and method proceed again to step 106.

If the maximum force has been determined to have been reached, the system and method proceed to step 110 at which the processor sets a target force value to a value that is a predefined percentage of the difference between the minimum force value that had been obtained at the starting z gap and the maximum force value.

The system and method then set the z gap based on the target force value. The processor, at step 112, controls the nozzle or build plate to increase the z gap by a predefined step amount, at step 104 obtains the force value at the newly set z gap, and at step 114 determines if the obtained force value meets the target force value. If the target force value has not yet been reached, the system and method proceed back to step 112. Once the target force value has been reached, the initial z gap for synthesizing an object has been reached and the method ends.

In an example embodiment, the method can be performed for each new object print job. Alternatively, in an example embodiment, the position of the nozzle or build plate, which is movable in the z direction, when set at the initial printing z gap is recorded so that it can be set to the same position for a number of print jobs.

Figure 2:
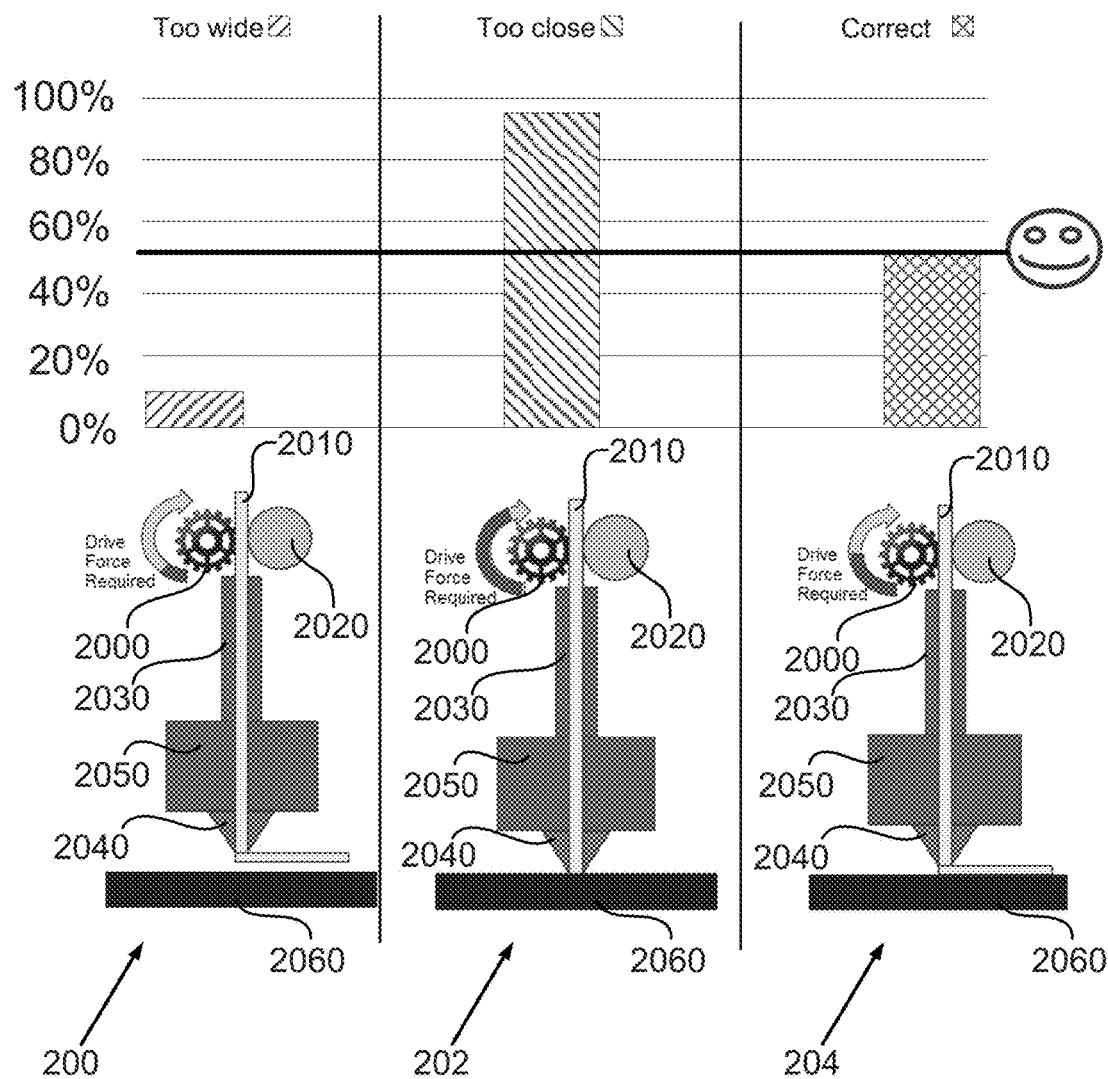
FIG. 2 illustrates setting a z gap according to the target force value defined as a predefined percentage of the difference between the minimum and maximum force values, according to an example embodiment of the present invention.

FIG. 2 illustrates, using a graph, the setting of the z gap according to the target force value set to a predefined percentage of the difference between the minimum and maximum force values. The abscissa of the graph represents the percentage a force, generated by filament deposition, is of the difference between the minimum and maximum force values.

In an instance where the z gap between the nozzle 2040 and the build plate 2060 is at a too wide position 200, the z gap is wider than the position at which the predefined percentage is actualized. For example, the drive force required to rotate the gear wheel 2000 to move the filament 2010 downward between the gear wheel 2000 and the idler wheel 2020 and through the connector tube 2030 and out the nozzle 2040, which is heated by the heater block 2050, is too little.

In an instance where the z gap between the nozzle 2040 and the build plate 2060 is at a too close position 202, the z gap is smaller than the position at which the predefined percentage is actualized. For example, the drive force required to rotate the gear wheel 2000 to move the filament 2010 downward between the gear wheel 2000 and the idler wheel 2020 and through the connector tube 2030 and out the nozzle 2040, which is heated by the heater block 2050, is too high.

In an instance where the z gap between the nozzle 2040 and the build plate 2060 is at the correct position 204, the z gap is at the position at which the predefined percentage (shown here to be approximately 50%) is actualized. For example, the drive force required to rotate the gear wheel 2000 to move the filament 2010 downward between the gear wheel 2000 and the idler wheel 2020 and through the connector tube 2030 and out the nozzle 2040, which is heated by the heater block 2050, is at the target percentage of the difference between the minimum and maximum force values.

Figure 3:
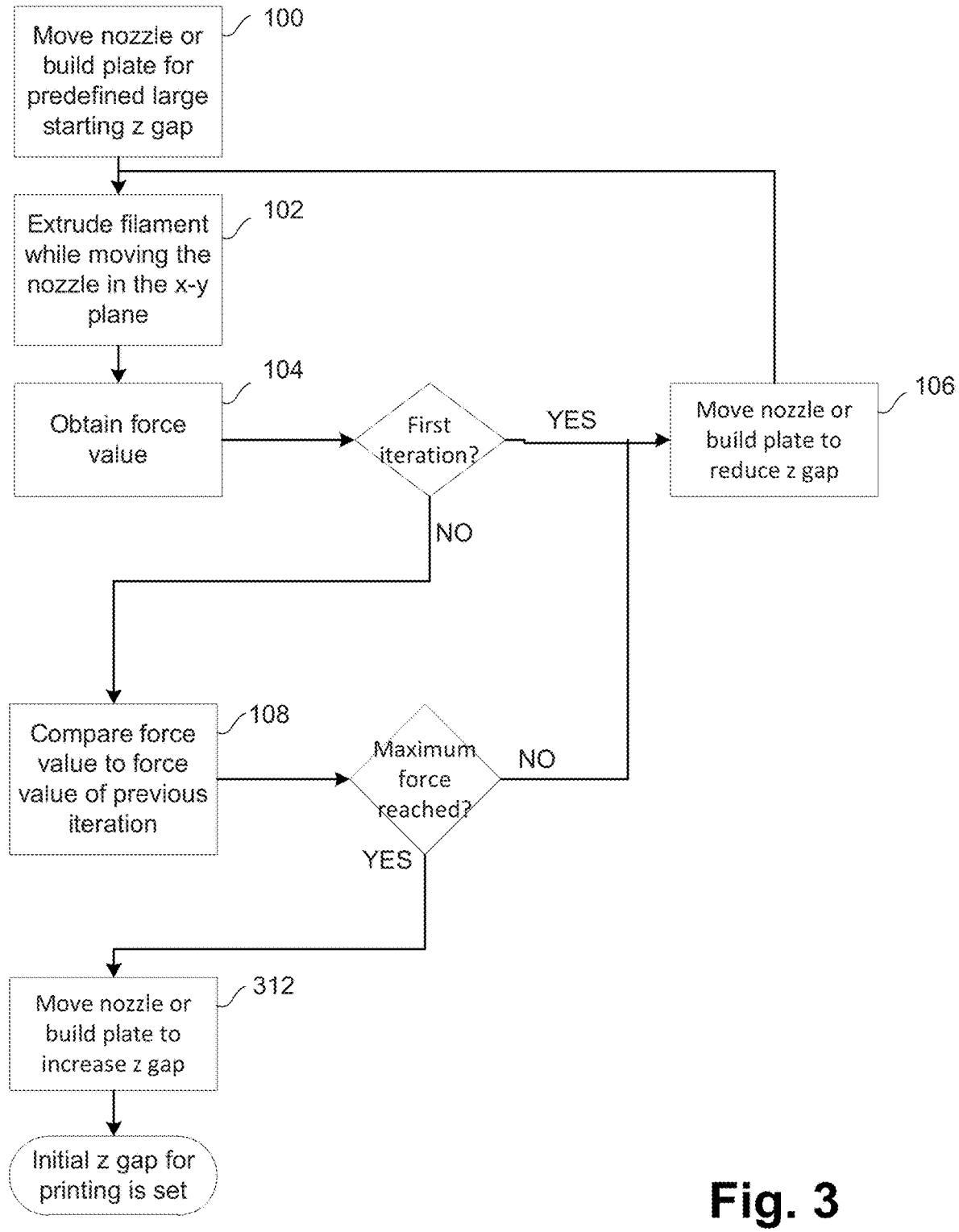
FIG. 3 is a flowchart that illustrates a method of setting a z gap of a 3D printer according to an alternative example embodiment of the present invention.

FIG. 3 is a flowchart that illustrates a method according to an alternative example embodiment of the present invention. The method according to this alternative example embodiment also includes steps 100, 102, 104, 106, and 108, and, for the sake of brevity, those steps are therefore not explained again with respect to this alternative method. The following is a description of the steps that differ from that of the method described with respect to FIG. 1. As an initial matter, it is noted that the method according to this alternative example embodiment does not include steps 110-114. According to this embodiment, once the processor determines that the maximum force has been reached, the system and method proceed to step 312 at which the processor controls the nozzle or build plate to increase the z gap by a predefined amount, at which point the initial z gap for synthesizing an object has been reached and the method ends. In an example embodiment, the method can be performed for each new object print job. Alternatively, in an example embodiment, the processor records the position of the nozzle or build plate (which is movable in the z direction) at which the z gap is set at the predefined amount greater than the z gap at which the maximum force had been recorded, so that the z-direction-movable nozzle or build plate can later be set to the recorded position for a plurality of print jobs in order to achieve the initial printing z gap.

Figure 4:
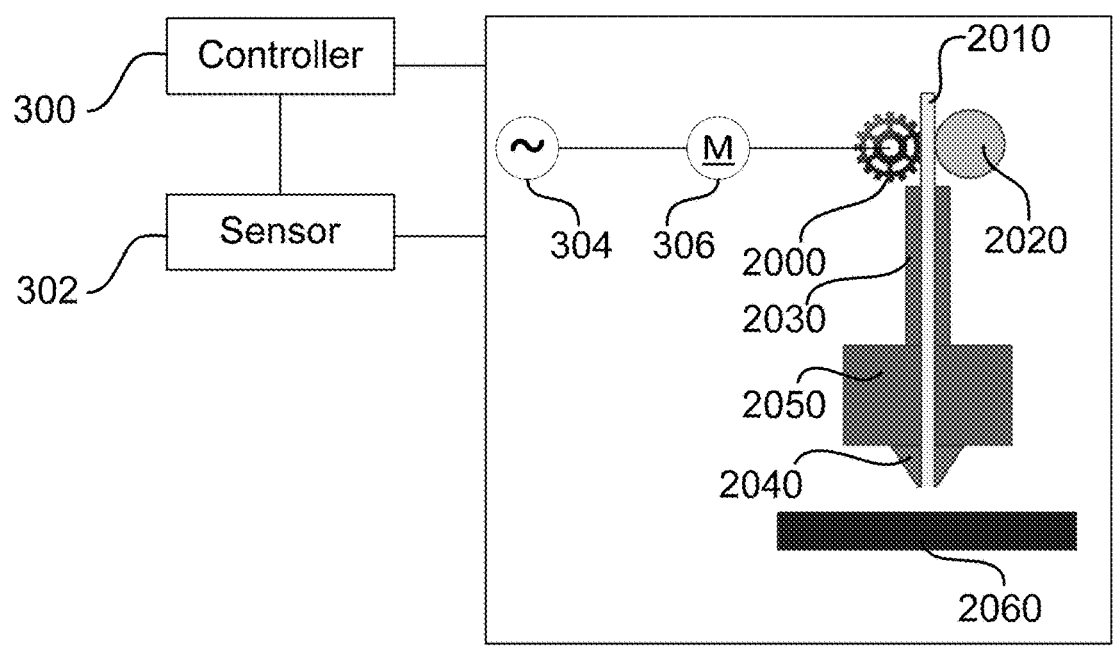
FIG. 4 is a diagram that schematically illustrates components of a 3D printing system according to an example embodiment of the present invention.

FIG. 4 is a diagram that schematically illustrates components of a 3D printing system according to an example embodiment of the present invention. A power source 304 provides power under control of a controller 300 to drive a motor 306 that drives the gear wheel 2000. A sensor 302 senses forces (or equivalent characteristics) and outputs sensor signals to the controller 300, which processes the signals and, based on the processed signals, sets the z gap and controls components of the 3D printer to shift, thereby modifying the z gap. In an example embodiment, the controller 300 also controls the power source 304 to provide the necessary power for driving the motor 306 to cause the filament 2010 to be extruded.

In an example embodiment, the sensor 302 senses an amount of power needed to drive the motor 306 to shift the filament 2010 a predefined distance through the connector tube 2030 leading to the nozzle 2050, the sensed amount of needed power corresponding to an amount of back Electro-Motive Force (EMF), which is the electromotive force pushing against the current driving the motor.

In an alternative example embodiment, the sensor 302 senses angular displacement of the drive gear 2000 driven by the motor 306 under the influence of a preset amount of drive power, where the less the angular movement, e.g., per unit of time, at the preset amount of drive power, the greater the force generated by the deposition of the filament 2010.

In an alternative example embodiment, the sensor 302 senses angular displacement of the idler wheel 2020 that turns as the filament 2010 travels linearly through the connector tube 2030 under influence of the drive gear 2000, which, in turn is driven by the motor 306 under the influence of a preset amount of drive power, where the less the angular movement, e.g., per unit of time, at the preset amount of drive power, the greater the force generated by the deposition of the filament 2010.

In an alternative example embodiment, the sensor 302 senses linear displacement of the filament 2010 as the filament travels linearly through the connector tube 2030 under influence of the drive gear 2000, which, in turn is driven by the motor 306 under the influence of a preset amount of drive power, where the less the linear movement, e.g., per unit of time, at the preset amount of drive power, the greater the force generated by the deposition of the filament 2010.

In an alternative example embodiment, the sensor 302 is a pressure sensor that senses a pressure applied to the build plate 2060 during the filament deposition, which pressure depends on the force generated by the filament deposition and therefore corresponds to the z gap.

In an alternative example embodiment, the sensor 302 is a pressure sensor that senses a pressure applied to the nozzle 2040 during the filament deposition, which pressure depends on the force generated by the filament deposition and therefore corresponds to the z gap.

An example embodiment of the present invention is directed to one or more processors, which can be implemented using any conventional processing circuit and device or combination thereof, e.g., a Central Processing Unit (CPU) of a Personal Computer (PC) or other workstation processor, to execute code provided, e.g., on a non-transitory computer-readable medium including any conventional memory device, to perform any of the methods described herein, alone or in combination, for controlling a 3D printer and/or processing sensor signals. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more non-transitory computer-readable media, e.g., as described above, on which are stored instructions that are executable by a processor and that, when executed by the processor, perform the various methods described herein, each alone or in combination or sub-steps thereof in isolation or in other combinations.

An example embodiment of the present invention is directed to a method, e.g., of a hardware component or machine, of transmitting instructions executable by a processor to perform the various methods described herein, each alone or in combination or sub-steps thereof in isolation or in other combinations.

The embodiments described above, which have been shown and described by way of example, and many of their advantages will be understood by the foregoing description, and it will be apparent that various changes can be made in the form, construction and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

That is, the above description is intended to be illustrative, and not restrictive, and is provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not be limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A method of controlling a three-dimensional (3D) printer, the method comprising:
    at least one of a nozzle of the 3D printer and a build plate of the 3D printer moving to a plurality of relative positions of the nozzle relative to the build plate, wherein the plurality of relative positions differ from one another with respect to respective distances between the nozzle and the build plate;
    at each of the plurality of relative positions:
        the 3D printer depositing filament by extruding the filament through the nozzle onto the build plate; and
        a sensor sensing a respective sensor value characterizing a respective value of a characteristic of the respective depositing that occurs at the respective relative position;
    a processor obtaining, from the sensor, the sensor values sensed for the plurality of relative positions;
    identifying, by the processor and based on the obtained sensor values, at least one of:
        a maximum one of all of the values of the characteristic characterized by all of the obtained sensor values; and
        a minimum one of all of the values of the characteristic characterized by all of the obtained sensor values; and
    based on the identified at least one of the maximum value and minimum value, the processor controlling movement of at least one of the nozzle and build plate thereby setting an initial gap between the nozzle and the build plate at which to deposit a first layer of an object to be synthesized.

2. The method of claim 1, wherein the characteristic is a force generated by and during the depositing.

3. The method of claim 2, wherein the identifying is of both the maximum value and the minimum value, and the setting includes selecting a force value that is a predefined percentage between the maximum value and the minimum value and setting the initial gap to one in which the force generated by the deposition of filament equals the selected force value.

4. The method of claim 2, wherein the setting includes setting the initial gap to be a predetermined amount more than the gap at which the maximum value occurs.

5. The method of claim 2, wherein the force is a back Electro-Motive Force (EMF) against a motor driving a filament through the nozzle during the depositing.

6. The method of claim 2, wherein the force is a force applied against the build plate.

7. The method of claim 2, wherein the force is a force applied against the nozzle.

8. The method of claim 1, wherein the characteristic is a pressure generated by the depositing.

9. The method of claim 8, wherein the pressure is one applied against at least one of the build plate and the nozzle.

10. The method of claim 1, wherein the characteristic is a displacement of a component of or within the 3D printer during the depositing.

11. The method of claim 10, wherein the displacement is an angular displacement of a component of the 3D printer during the depositing.

12. The method of claim 11, wherein the angular displacement is of a gear wheel that rotates to linearly displace the filament to expel the filament through the nozzle.

13. The method of claim 11, wherein the angular displacement is of an idler wheel that rotates when the filament is linearly displaces for expelling the filament through the nozzle.

14. The method of claim 10, wherein the displacement is a linear displacement occurring in the 3D printer during the depositing.

15. The method of claim 14, wherein the linear displacement is of the filament.

16. The method of claim 10, wherein the setting of the initial gap is based on the minimum value and includes selecting a vertical position of the nozzle or build plate that is a predefined distance from the vertical position of the nozzle or build plate at which the distance, to which the minimum value corresponds, is established.

17. The method of claim 1, wherein the moving of the at least one of the nozzle and the build plate to the plurality of relative positions and the sensing of the respective sensor values includes:
    setting the gap to an initial value and subsequently iteratively reducing the gap from the initial value stepwise by a predefined amount;
    controlling the 3D printer to deposit filament in each iteration; and the sensor sensing a respective one of the sensor values in each iteration characterizing the depositing during the respective iteration.

18. The method of claim 17, wherein the identifying includes determining that the obtained sensor values of two or more immediately contiguous ones of the iterations are substantially the same after having changed between prior ones of the iterations.

19. A system comprising:
a 3D printer that includes a nozzle and a build plate;
a sensor; and
processing circuitry communicatively coupled to the sensor;
wherein the 3D printer is configured to perform a method that includes:
    at least one of the nozzle and the build plate moving to a plurality of relative positions of the nozzle relative to the build plate, wherein the plurality of relative positions differ from one another with respect to respective distances between the nozzle and the build plate;
    at each of the plurality of relative positions:
        the 3D printer depositing filament by extruding the filament through the nozzle onto the build plate; and
        the sensor sensing a respective sensor value characterizing a respective value of a characteristic of the respective depositing that occurs at the respective relative position; and
    the processing circuitry:
        (a) obtaining, from the sensor, the sensor values sensed for the plurality of relative positions;
        (b) identifying, based on the obtained sensor values, at least one of:
            a maximum one of all of the values of the characteristic characterized by all of the obtained sensor values; and
            a minimum one of all of the values of the characteristic characterized by all of the obtained sensor values; and
        (c) based on the identified at least one of the maximum value and minimum value, controlling movement of at least one of the nozzle and build plate thereby setting an initial gap between the nozzle and the build plate at which to deposit a first layer of an object to be synthesized.

20. A non-transitory computer-readable medium on which are stored instructions that are executable by a processor and that, when executed by the processor, cause the processor to perform a method of controlling a three-dimensional (3D) printer, the method comprising:
    controlling at least one of a nozzle of the 3D printer and a build plate of the 3D printer to move to a plurality of relative positions of the nozzle relative to the build plate, wherein the plurality of relative positions differ from one another with respect to respective distances between the nozzle and the build plate;
    at each of the plurality of relative positions, controlling the 3D printer by which the 3D printer deposits filament by extruding the filament through the nozzle onto the build plate, wherein a sensor of the 3D printer is configured to sense a respective sensor value characterizing a respective value of a characteristic of the respective depositing at the respective relative position;
    identifying based on the obtained sensor values, at least one of:
        a maximum one of all of the values of the characteristic characterized by all of the obtained sensor values; and
        a minimum one of all of the values of the characteristic characterized by all of the obtained sensor values; and
    based on the identified at least one of the maximum value and minimum value, controlling movement of at least one of the nozzle and build plate thereby setting an initial gap between the nozzle and the build plate at which to deposit a first layer of an object to be synthesized.

* * * * *